(12) United States Patent
Rogers

(10) Patent No.: US 6,238,329 B1
(45) Date of Patent: May 29, 2001

(54) CENTRIFUGAL SEPARATOR FOR MIXED IMMISCIBLE FLUIDS

(76) Inventor: Ernest E. Rogers, 1735 E. Cherokee, Pleasant Grove, UT (US) 84062

( * ) Notice: Subject to any disclaimer, the term of this patent is extended or adjusted under 35 U.S.C. 154(b) by 0 days.

(21) Appl. No.: 09/245,256

(22) Filed: Feb. 5, 1999

(51) Int. Cl.[7] ............................... B04B 5/06; B04B 7/12; B04B 11/00
(52) U.S. Cl. ............................... 494/22; 494/56; 494/60; 494/67; 494/79; 494/84; 494/901
(58) Field of Search .................... 494/22, 42, 43, 494/56, 60, 67, 74, 79, 84, 901, 37

(56) References Cited

U.S. PATENT DOCUMENTS

| | | | |
|---|---|---|---|
| 3,960,319 | * | 6/1976 | Brown et al. . |
| 4,350,282 | * | 9/1982 | Dudrey et al. . |
| 4,824,430 | * | 4/1989 | Kashihara et al. ............... 494/22 |
| 4,846,780 | * | 7/1989 | Galloway et al. ............... 494/45 |
| 4,857,040 | * | 8/1989 | Kashihara et al. ............... 494/22 |
| 5,024,647 | * | 6/1991 | Jubin et al. ............... 494/43 |
| 5,387,342 | * | 2/1995 | Rogers et al. ............... 494/43 |
| 5,582,724 | * | 12/1996 | Rogers et al. ............... 494/60 |
| 5,591,340 | * | 1/1997 | Meikrantz et al. ............... 494/60 |
| 5,624,371 | * | 4/1997 | Mohn ............... 494/56 |

* cited by examiner

Primary Examiner—Charles E. Cooley
(74) Attorney, Agent, or Firm—Holme Roberts & Owen LLP

(57) ABSTRACT

A machine for separation two liquids of different densities from a mixture has a separation chamber with radially disposed fins that rotates about a central axis. The separation chamber has an outside wall with a first weir extending toward the central axis and spaced from the central axis a distance or radius that is less than the distance of the boundary between the two fluids in the separation chamber. The mixture separates into a first volume of the first fluid and a second volume of the second fluid. The first fluid exits past the first weir. The second fluid passes into a channel or volume and then past a second weir. The channel or volume is sized so that the angular momentum of the second fluid is conserved and develops a force to retain the first fluid and the second fluid in the separation chamber. The separation chamber is in a housing which contains a first collecting chamber to collect the first fluid and a second collecting chamber to collect the second fluid. Other arrangements are available to remove gas entrained in the mixture and solids such as sludge entrained in the mixture.

40 Claims, 7 Drawing Sheets

CENTRIFUGAL SEPARATOR FOR MIXED IMMISCIBLE FLUIDS

BACKGROUND OF THE INVENTION

1. Field of the Invention

This invention relates to machines for separating mixed fluids. More particularly this invention relates to a rotating centrifuge-type machine which may be used, for example, to separate oil and water.

2. State of the Art

A fluid or mixture composed of two or more immiscible components, typically liquids of differing densities will, in the presence of the earth's gravitational field, will typically separate into layers with the least dense floating on top of the next most dense. With one component separated from the other, an interface or boundary between the two components is formed. The interface or boundary is typically quite distinct.

The process of gravitational separation may take a significant period of time based on, among other things, the volume of the involved fluids, the densities of the fluids, viscosity, temperature, and the like. To avoid delay and to expedite the separation process, it has long been recognized that the gravitational separation process may be greatly enhanced with regard to time and separation quality by replacing earth's "gravitational acceleration" with centrifugal force. That is, the fluids to be separated are placed in a container or vessel which is then spun to impose centrifugal forces. Based on, for example, the rotation rate, the force field thus provided may have a magnitude amounting to hundreds or even thousands of "g's." The gravitational force at sea level is sometimes regarded as 1 "g" and is typically presented as an acceleration of 32 feet per second per second. Simply stated, the force to separate the liquids may be up to several hundreds or thousands of times stronger than the earth's gravitational force.

Centrifuges or separators to effect the separation of two liquids using centrifugal force are well known. U.S. Pat. No. 4,525,155 (Nilsson) discloses a typical centrifuge of the type for separating two liquids. However, the Nilsson machine appears to have a limited capacity or flow rate due to its relatively small weir structures. Some centrifuges need a complex and expensive construction in order to obtain satisfactory separation efficiency. U.S. Pat. No. 5,387,342 (Rogers, et al.) and U.S. Pat. No. 5,582,724 (Rogers, et al.), as well as U.S. Pat. No. 4,525,155 (Nilsson) are illustrative of such machines.

Centrifuges are not typically recognized to be suitable or adaptable to deal with different input fluids. That is, the mixture may change and be made up of different pairs or combinations of fluids of varying compositions, component densities, and flow rates. External control systems or requirements for frequent adjustment to obtain satisfactory operation are typically needed for those machines having provisions to adapt to varying or differing mixtures or conditions of operation. Besides having only limited effectiveness, such designs are generally complicated to build and operate, making them inefficient or uneconomical.

Some known centrifuges or separators are incapable of operation where input flow and output flows must be maintained at certain pressures. For example, the centrifuges disclosed by U.S. Pat. No. 5,582,724 (Rogers, et al.) have no ability to deliver separated fluids into pressurized lines. Centrifuges of the type illustrated by U.S. Pat. No. 4,525,155 (Nilsson) utilize a paring disk discharge which limits output pressures.

Known centrifuges are not effective if the fluid mixture to be separated contains gas and solid components as well as liquids. That is, centrifuges that are effective in separating two liquids of different densities have no ability for separating and discharging substantial proportions of gas entrained in the input flow. U.S. Pat. No. 5,582,724 (Rogers, et al.) does not provide a means to extract gas from the mixture or from the separated or separating fluids. Further, there is no provision for discharging solids such as sludge, grime, entrained dirt and stone and other physical impurities which tend to build up in the interior of the centrifuge, resulting in a need for periodic cleaning. The centrifuge or U.S. Pat. No. 4,525,155 (Nilsson) does have structure for discharging solids, but the mechanism provided to do so adds greatly to the cost and complexity of the machine.

From the foregoing, it will be appreciated that it would be an advancement in the art to provide a centrifuge of uncomplicated and inexpensive construction, which would automatically separate fluids of varying composition and flow rates and having a wide range of component densities without requiring external control or adjustment of the centrifuge.

It would be a further advancement in the art to provide such a centrifuge that is capable of higher flow capacity for its size than centrifuges in the art. It would also be an advancement in the art to provide a capability to separate fluids at various conditions of fluid pressure, and in the presence of gas and solid components, while also achieving the other advancements mentioned.

SUMMARY OF THE INVENTION

A machine is provided for separating a mixture having a first fluid and a second fluid both of which are preferably liquids. The first fluid and second fluid are of differing densities and, in turn, are susceptible to separation when left standing. The machine has a housing having a central axis. Within the housing is positioned a separation chamber sized to receive and contain a volume of the mixture to be rotated. Fin means are positioned within the separation chamber to rotate therewith. The fin means function to urge the volume and preferably at least one of a first volume of the first fluid and a second volume of the second fluid to rotate with the separation chamber.

Upon separation, the first volume of a first fluid is formed along with the second volume which is of the second fluid. As the mixture rotates, a boundary is formed between the first volume and the second volume at a boundary distance from the central axis.

The machine is provided with an inlet connected to supply the mixture from the exterior to the housing and into the separation chamber. A first weir is connected to the outer wall of the separation chamber and sized to extend toward the central axis and to be spaced from said central axis a first distance selected to be less than the boundary distance to define a first outlet from the separation chamber about the central axis. One of the first fluid and the second fluid passes through the first outlet to exit from the separation chamber.

The machine includes a motor means connected to rotate the separation chamber and the mixture therein. The motor means includes a chamber portion which is positioned proximate the separation chamber in a manner to cause rotation of the separation chamber. The chamber portion is configured to extend away from the central axis a channel distance and is spaced relative to the outer wall to define a channel or passageway for fluid to exit from the separation chamber.

A second weir is connected to one of the chamber portion and the outer wall. The second weir is sized to extend toward the central axis and to be spaced therefrom a second distance selected to be less than the channel distance to define a second outlet from said separation chamber. The other of said first fluid and said second fluid exits from the separation chamber through the second outlet.

Other embodiments include a first fluid chamber and a second fluid chamber positioned to receive the first fluid from the first outlet and the second fluid from the second outlet. Yet, further embodiments include structure for separation and removal of solids and for removal of gas. A preferred embodiment has an overlap distance between the first weir and the channel selected to have the boundary of the first and second fluids therealong.

In a highly preferred alternate embodiment, a second weir volume is formed by the chamber portion. The second weir is in communication with the channel formed by the chamber portion with the outer wall of the separation chamber. The second weir volume is rotatable with the separation chamber at an angular velocity so that the fluid in the second weir volume develops an angular momentum sufficient to retain said first volume and said second volume in the separation chamber with some of the fluids exiting through the first outlet and the second outlet.

The present invention includes an important construction in which fluids in the separation chamber are constrained to rotate at constant angular velocity ($\omega$) equal to the angular velocity of the separation chamber, by including a plurality of axially and radially disposed fins or partitions within the separation chamber. Another important construction allows exceptional freedom of motion within the second weir volume from the channel and into the second outlet by its openness of construction, having no fins, partitions, channels, or other flow obstructions within it. The second weir volume is so constructed to substantially conserve angular momentum of the fluid. That is, the angular momentum of the fluid is retained without the presence of fins or comparable structure that cause the fluid in the second weir volume to rotate at constant angular velocity. As understood constructions heretofore have an outlet (e.g., water outlet) which is subdivided either by fins or by partitions to restrain rotation, as in U.S. Pat. No. 5,582,724 Rogers, et al.). Prior constructions are also understood to be not adequately formed to insure approximate conservation of momentum within the channel.

In the present invention, the rotational velocity of the fluids such as, for example, oil and water, in the separation chamber is preferably essentially constant at the velocity ($\omega$) of the separating chamber, while in the second weir volume, the rotational velocity of the water ($\omega_w$) varies to conserve momentum. This characteristic may be expressed in the Following relationship $$r\omega_w = r_p \omega \quad (1)$$

where r equals the radius of a unit of one fluid such as water $r_p$ equals the radius of structure which defines the exit channel and is the channel distance.

$\omega$ equals the rotational velocity of the separation chamber.

$\omega_w$ equals the rotational velocity of the water in the water outlet channel.

With these conditions, Equation 5 as hereinafter set forth can be integrated and solved for the position of the interface, or boundary, which, for an oil-water mixture, is the oil-water boundary. The following expression or equation is the solution.

$$r_b = \sqrt{\frac{\rho_w r_p^2 [1 - 2\ln(r_p/r_w)] - \rho_o r_o^2}{\rho_w - \rho_o}} \quad (2)$$

where $r_b$ equals the radius of the boundary between the first fluid and the second fluid.

$r_o$ equals the radius or distance of the first weir from the central axis $r_w$ equals the radius or distance of the second weir from the central axis $\rho_w$ is the density of water $\rho_o$ is the density of oil ln is the natural log of the expression following in parentheses In summary, construction of a centrifuge according to this preferred embodiment, yielding fixed rotational velocity in the separation chamber and fluid momentum conservation in the second weir volume, allows the designer to mathematically obtain the position of the interface within the separation chamber for a prescribed set of design and operating conditions. In turn the weirs may be sized to accommodate different mixtures. For example, one mixture could have water as one fluid and as the other oil having a specific gravity of 0.8; and another mixture could have water as one fluid and as the other fluid, oil having a specific gravity of 0.9.

DESCRIPTION OF THE DRAWINGS

In the drawings, which illustrate what is presently regarded as the preferred embodiments and the best mode for carrying out the invention.

DESCRIPTION OF THE ILLUSTRATED EMBODIMENTS

A common example of fluid separation is that of oil from water. Applications requiring separation of oil and water include the dehydration of oil produced by oil wells and remediation of oil contamination in or of water. Accidental oil spills on any body of water such as, an ocean or lake, or in a stream, require prompt separation. Such separation efforts typically involve high volumes of fluid at rapid flow rates. Oil and water may also typically be found with many other contaminants in ships' bilges. Separation is desired to minimize external contamination. Many other examples may be found in which liquids need to be separated. For example, within the food processing industries, there is a need to separate vegetable oils or animal fats from water or aqueous food components. However, discussion in reference to oil and water separation is not intended to limit the applicability of the present invention to any two liquids which are mixed and need to be separated.

Figure 1:
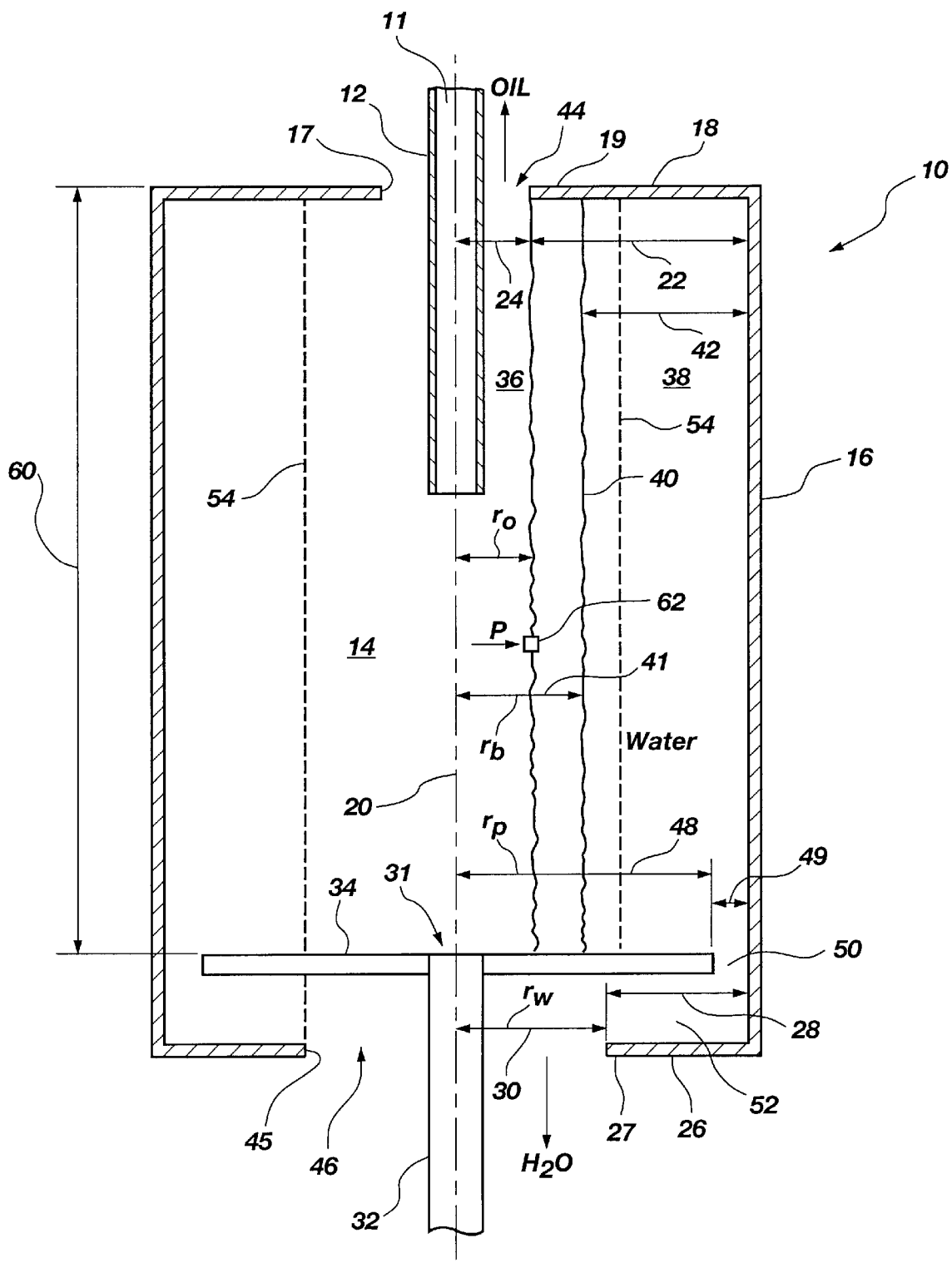
FIG. 1 is a simplified cross sectional depiction of a machine of the present invention.

The principles of operation of the illustrated embodiments can be better understood by reference to a simplified depiction of a machine 10 of the present invention in FIG. 1. A mixture 11 of two fluids of different densities (e.g., oil and water) is supplied via an inlet 12 into the separation chamber 14 having an exterior wall 16. A first weir 18 extends inwardly from the exterior wall 16 toward the central axis 20 a distance 22 and is spaced from the central axis a distance 24 both selected as hereinafter discussed.

A second weir 26 is here shown to extend from the exterior wall 16 of the separation chamber 14, a distance 28 and is spaced from the central axis 20 a distance 30. In another arrangement, the second weir 26 may extend from other structure such as the chamber portion 31. A chamber portion 31 is shown in FIG. 1.

The separation chamber 14 is cylindrical in shape and is here shown in cross section. It is rotated by the motor means which includes a motor (not shown) connected with the chamber portion 31 extending into the separation chamber 14. That is, the chamber portion 31 is here shown to include drive shaft 32 and a plate 34 sized to block or retain one of the two separated liquids in the separation chamber 14. The chamber portion 31 has structure, such as plate 34, which extends toward the outer wall 16 a distance 48 ($r_p$) and in turn, is spaced from the outer wall a distance 49 to define a channel 50 from the second volume 38 to a second weir volume 52 which is defined by the second weir 26 and the structure such as plate 34, of the chamber portion 31. The second weir volume 52 is in direct fluid communication with the second outlet 46. The second outlet 46 is formed by the tip 27 of the second weir that is spaced from the outer wall 16 a distance 28 and that is spaced from the central axis 20 a distance 30 ($r_w$).

It should be recognized that the motor means may also include structure in the inlet 11 to propel the separation chamber 14. Other external means may also be connected or positioned to power the separation chamber 14. The plate 34 may in that event be affixed by brackets, spokes or the like to provide the necessary channel configuration for the second fluid to exit the separation chamber 14.

Figure 2:
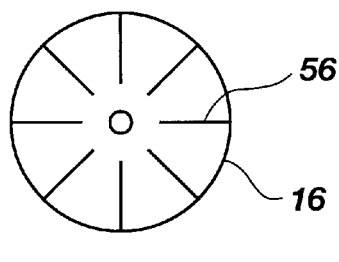
FIG. 2 is a simplified cross sectional illustration of one form of a separation chamber of the present invention.
Figure 3:
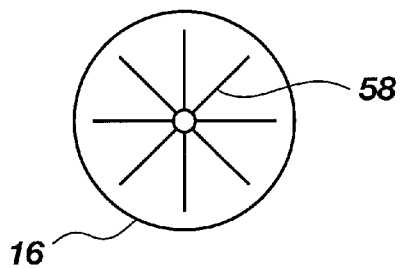
FIG. 3 is a simplified cross sectional illustration of another form of a separation chamber of the present invention.

In operation, the mixture 11 is rotated with the separation chamber 14 by use of fins such as fin 54 shown in phantom in FIG. 1. FIGS. 2 and 3 show the outer wall 16 each with a plurality of fins 56 and 58 mounted to extend the height 60 of the separation chamber 14. Other arrangements of fins may be provided to urge at least one of the first volume 36 and the second volume 38, and preferably both, to rotate with the separation chamber 14. Rotation of the separation chamber 14 in turn separates the mixture 11 into a first volume 36 of the first fluid and a second volume 38 of the second fluid with an interface or boundary 40 therebetween spaced a distance 41 ($r_b$) from the central axis 20 and a distance 42 from the outer wall 16. The first weir 18 is sized to extend from the outer wall 16 a distance 22 so that the first weir 18 and, more particularly, the lip, edge or tip 19 of the first weir 18, is spaced from the central axis 20 a distance 24 ($r_o$). In turn, the first weir 18 defines an annular opening which is the first outlet 44 through which the first fluid (oil) exits.

The illustrated machine 10 is preferably oriented with the first outlet 44 above or on top. The first fluid is the one with the lesser density or the lighter fluid (such as oil) and exits upwardly through the first outlet 42. The second outlet 44 is on the bottom or downward. The heavier or more dense fluid (such as water) exits downwardly through the channel 50, the second weir volume 52 and the second outlet 46.

Machine 10 shows a preferred arrangement with outlets 44 and 46 at opposite ends of the separation chamber 14. In alternate arrangements, the first outlet and the second outlet may be placed coaxially at one end of the separation chamber or reversed in relative orientation. In other alternative arrangements, the central axis 20 may be oriented other than vertically and may even be horizontal.

For clarity of illustration, the two fluids to be separated by the machine 10 have been and will continue to be referred to as oil and water. It should be understood that any two immiscible fluids of differing densities may be supplied together as a mixture 11 for separation.

To better understand the invention, it should be noted that a useful form of Archimedes' principle provides that at the horizontal interface between a floating body (oil) and the underlying body (water), the downward force exerted by the floating body (oil) is exactly balanced by the upward pressure of the underlying body (water). The downward force of the oil at the interface is the total of the forces exerted on the individual elements of the oil atop the interface.

Applying the Archimedes' principle to a centrifugal separator, the outward or centrifugal force exerted by the floating or lighter fluid (oil) is exactly balanced by the inward pressure of the outer or heavier fluid (water) at the boundary or interface. That is, the outward force of the oil at the interface or boundary is the total of the forces exerted on the individual elements of the oil, which equals the sum of forces along elements of water beginning at the water surface ($r_w$) and ending at the interface ($r_b$), being the force directed inwardly by the water. Referring to FIG. 1, the force dP on a differential volume or unit of oil 62 due to centrifugal force may be stated by the following relationship:

$$dP = \rho_o \omega^2 r \, dr \qquad (3)$$

where dP is the incremental force applied to any unit 62 of oil $\rho_o$ is the density of the oil $\omega$ is the angular velocity of the unit 62 of oil r is the radial distance of the unit 62 of oil from the axis of rotation dr is the incremental change in radius across each unit 62 of oil.

Therefore, the total force P for the oil is the integral of the incremental force for all the units of oil. The total outward force of the oil in the first volume 36 at the interface or boundary 40 is the integrated sum of forces on all elements of the oil and may be expressed by the following integral equation or expression:

$$P = \int_{r_o}^{r_b} \rho_o \omega^2 r \, dr \quad (4)$$

where the symbols mean the same as hereinbefore defined.

In a similar fashion, the pressure at the interface 40 due to forces in the surrounding water can be calculated by integration from the free water surface (at $r_w$) to the water passageway or channel (at $r_p$) and then from the water passageway or channel to the interface (at $r_b$). From Archimedes' principle, these two forces must be equal at equilibrium. In turn, they may be equated by the following integral expression:

$$P = \int_{r_o}^{r_b} \rho_o \omega^2 r \, dr = \int_{r_w}^{r_p} \rho_w \omega_w^2 r \, dr + \int_{r_p}^{r_b} \rho_w \omega^2 r \, dr \quad (5)$$

where the symbols mean the same as hereinbefore defined.

In general, the fluid intensive properties, $\rho_o$, $\rho_w$, $\omega$, and $\omega_w$, may be variable functions of location within the centrifuge. In order to perform the indicated operations, the densities ($\rho$) and the motions ($\omega$) of the fluids must be known for all elements within the ranges of integration.

The invention as illustrated in FIGS. 1–3 provides improvements to facilitate construction, reduce cost, and improve operating performance. For example, the radii of the annular oil and water outlets can be substantially greater, and their proportionate difference is increased, as compared to centrifuges in the prior art. The greater dimensions of radius 24 and radius 30 provide greater flow capacity and improved separation performance over a range of fluid flow rates compared to machines of comparable physical size and horsepower (motor). Also, the machine is useful for mixtures 11 of a wider range of flow rates, composition and variations in component densities. Further use of the machine, with a wider range of mixtures, is facilitated because the construction facilitates the use of mathematical techniques to predict and in turn control operation.

It may also be noted that construction of the water exit structure including the channel 50, the second weir volume 52, and the second outlet 46 reduce manufacturing cost. The cost of casting and machining the arrangement is less compared with the cost to manufacture the exit structure of, for example, in U.S. Pat. No. 5,582,724 (Rogers, et al.).

Figure 4:
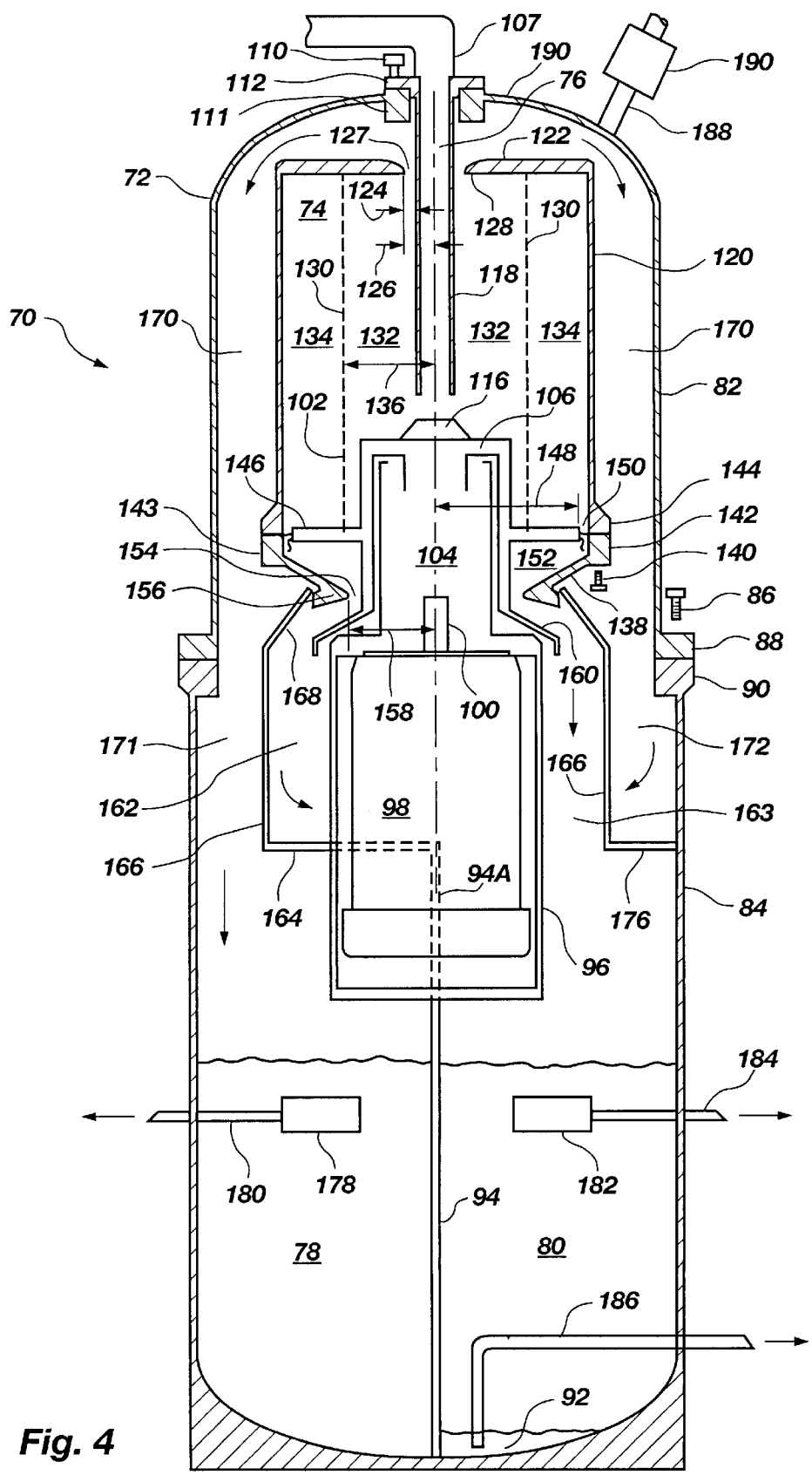
FIG. 4 is a simplified essentially cross sectional illustration of another form of a machine of the present invention.

Turning now to FIG. 4, a more detailed embodiment of a separation machine 70 is depicted. The machine 70 is generally cylindrical in shape and is shown here in cross section. The machine 70 has a cylindrical housing 72, which contains a cylindrical separation chamber 74 connected to motor means to rotate about a central axis 76. The housing includes a first collection chamber 78 for collecting a first fluid after separation and a second collection chamber 80 for collecting a second fluid after separation.

The housing 72 is formed to have an upper section 82 and a lower section 84 bolted together with a plurality of bolts such as bolt 86 through opposite shoulders 88 and 90 formed to mate when assembled. The lower section 84 has a base 92 formed to support the machine 70 on an appropriate surface such as a cement or metal surface. Alternately, supports or brackets can be easily devised to permit mounting the machine 70 in any convenient or desired location. Extending upwardly from the bottom area is a transverse divider 94. The transverse divider 94 extends diametrically through the interior of the housing 72 to create or define the first collection chamber 78 and the second collection chamber 80. The transverse divider 94 also extends upwardly to the motor means which includes a motor housing 96. That is, the motor means includes the motor housing 96 with the motor 98 fixedly mounted therein with a shaft 100 extending into a chamber portion 102. The chamber portion 102 includes a bearing section 104 with a casing 106 that rotates about the bearing section 104.

An inlet 107 receives a mixture of two fluids of different densities from a source. The inlet 107 is bolted to the housing 72 by a plurality of bolts 110 that fasten flange 112 to a bolt receiver 114. The inlet 107 directs the mixture into the separation chamber 74. In the embodiment of FIG. 4, the inlet 107 extends into the interior of the separation chamber 74 along the central axis 76 so that the mixture is directed toward a diversion plate 116 which is attached by any desired means to the casing 106. It may be understood that the inlet 107 may be configured in any desired way to direct the mixture into the interior of the separation chamber 74. The illustrated centrally disposed extension 118 is preferred to avoid interference with the separation of fluids and avoid contamination of the separated material exiting the separation chamber 74.

The separation chamber 74 is cylindrical in shape with an outer wall 120. A first weir 122 extends inwardly from the outer wall and is spaced from the extension 118 a distance 124 and from the central axis a distance 126 which define the first outlet 127 as an annular opening about the extension 118. The distances 124 and 126 are selected so that the edge 128 of the first weir is spaced inwardly of the boundary or interface 130 between the first volume 132 and the second volume 134 formed of the first liquid and the second liquid respectively. That is, the distance 126 is less than the radius 136 of the boundary 130.

The second weir 138 is shown extending inwardly from the outer wall 120. The second weir 138 is bolted by a plurality of bolts such as bolt 140 through shoulder 142 to hip 144. The second weir 138 may be attached to the casing 106 or otherwise positioned to deflect or direct the second fluid from the second volume 134 into the second collection chamber 80 as discussed hereinafter. It may also be noted that a plurality of spokes, such as spoke 143, interconnect the casing 106 and the second weir 138 and in turn attach the entire separation chamber 74 including the outer wall 120 and the first weir 126 to rotate with the casing 106 and the drive shaft 100.

The casing 106 is here shown with a flange 146 which extends outwardly and toward the outside wall 120 a distance which is more than the radius 136 of the boundary 130, but spaced from the outer wall 120 to define a channel 150 through which the second fluid passes into the second weir volume 152. That is, the second weir volume is defined by the flange 146 and the second weir 138 to receive the second fluid from the channel 150 and communicate the second fluid to the second outlet 154. The edge 156 of the second weir 138 is spaced from the central axis 76 a distance 158 which is greater than the distance 126. A plurality of radially spaced apart spokes 143 interconnect the plate 146 to the outer wall 120 and more specifically shoulder 142 to support the separation chamber 74.

In operation, the mixture is urged into the separation chamber 74 which is rotating at a high rate of speed (e.g., 3450 revolutions per minute). The mixture is separated with the first fluid (e.g., oil) becoming the first volume 132 and the second fluid (e.g., water) becoming the second volume 134. As the separation chamber rotates, the water is urged by the centrifugal pressure of the entire volume out through the passageway or channel 150 and into the second weir volume 152. From the second weir volume 152, the water passes over the edge 156 and then outwardly to contact plate 168. Thereafter it travels into the second collection chamber 80.

Since the second weir 138 is circular in transverse section, the second outlet 154 is annular. As better seen in FIGS. 4 and 8, a collection section 162 and a collection area 163 are formed in communication with second collection chamber 80. The collection section 162 has a base 164 that extends only half way around the motor housing 96 as shown with shading to indicate structure and not cross section in FIG. 8 to terminate at the portions 94A and 94B of the transverse divider 94 so that the water may flow from the collection section 162 and from the collection area 163 into the second collection chamber 80.

Figure 8:
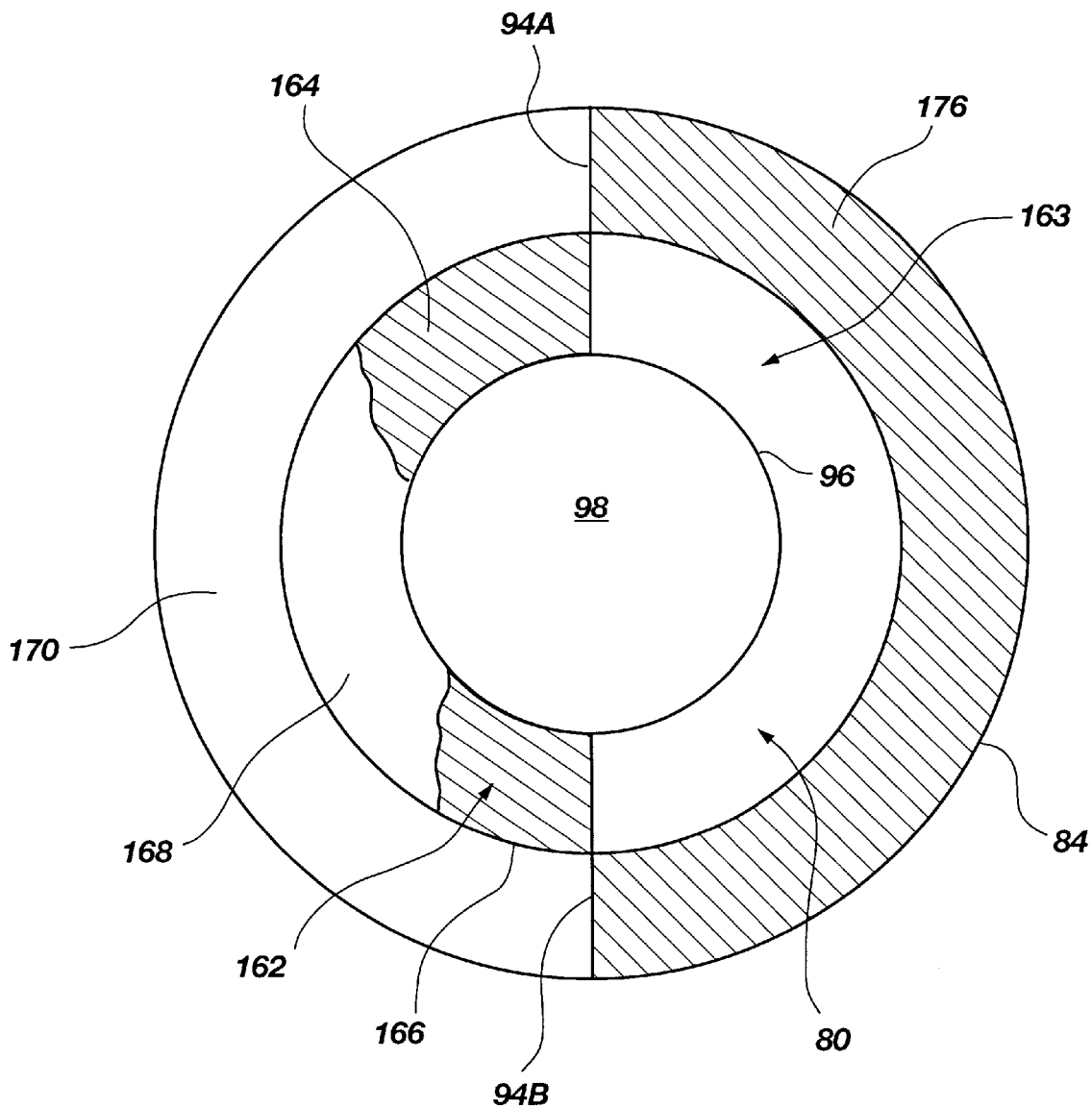
FIG. 8 is a simplified depiction of a cross section of the machine of FIG. 4 showing portions of collection sections for the fluids.

The vertical plate 166 extends all the way around the motor housing 96 as does the first splash plate 168 shown only in partial cut-a-way in FIG. 8. The vertical plate 166 functions to form the outer wall of the collection section 162 for one half of its perimeter and as the inner wall of the outer channel 170. Thus, water passing through the second outlet 154 does not enter into the first collection volume 78. Rather it is directed into the second collection volume 80.

The first fluid (e.g., oil) from the first volume 132 is directed out the first outlet 127 and over the edge 128 of first weir 122 into the outer channel 170. The oil then proceeds into collection area 171 as well as into collection section 172 which is defined by the outer wall of the housing 72 and the vertical plate 166. The floor 176 extends halfway around the housing 72 and at the same time half way around the vertical plate 166 to the portions 94A and 94B of the transverse divider 94 as shown in FIG. 8 in partial shading not to show cross section but to show a solid surface. Thus oil may proceed from all points in the channel 170 through either area 171 or section 172 into the first collection chamber 78.

The first fluid in the first collection chamber 78 is removed by an external pump, by gravity feed, by pressure internal to the housing or by siphon. A float valve 178 is connected to a discharge line 180. The float valve 178 functions to open as the liquid level in the first collection chamber 78 increases over a preset amount or so that the first fluid may be discharged.

In a similar fashion, a second float valve 182 is connected to a discharge line 184 to pass the second fluid such as water when the level in the second collection chamber 80 exceeds a preselected amount or level. The second fluid such as water may leave by pressure internal to the housing, by siphon, by gravity feed or preferably by a suction applied by a not shown pump through line 184.

In FIG. 4, it may also be seen that a sediment suction line 186 is provided and directed to a position proximate the bottom of the second collection chamber 80. The sediment suction line 186 is connected to a remote source of vacuum or suction to urge sand and other sedimentary material out of the second collection chamber 80. Of course the sedimentary material, to the extent it exists in the mixture, is collected in the water as the separation chamber 74 rotates.

A gas exhaust line 188 is shown connected near the top 190 of the housing 72. A pressure regulator valve is connected in the exhaust line 188 and set to operate to allow gas to pass therethrough under preselected conditions (e.g., a preset pressure from about 5 to 25 psi). In this way, excess gas may be removed easily. Notably, the gas line may be connected to the housing 72 at any convenient location as long as it is above the level of the first fluid in the first collection chamber 78.

Figure 5:
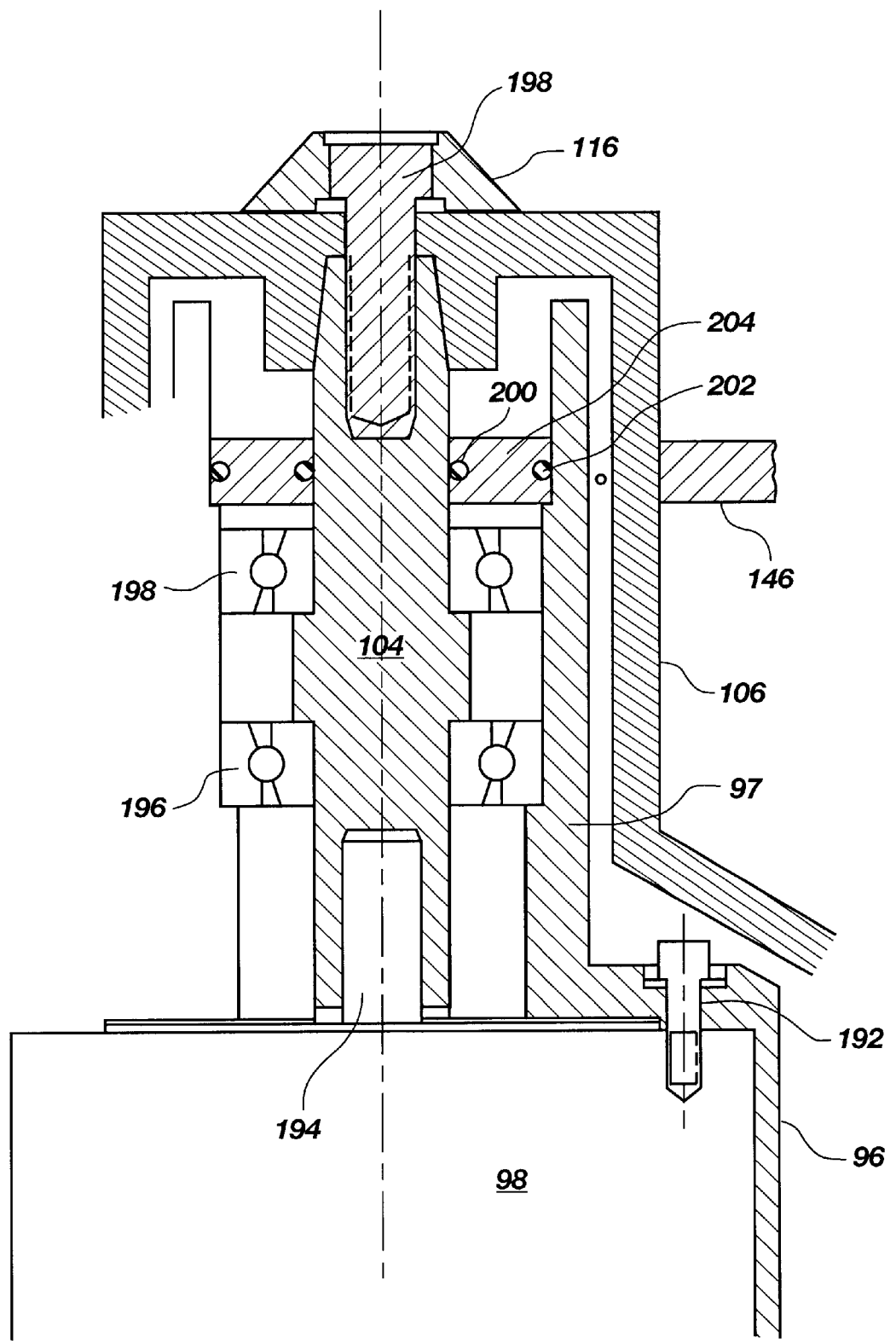
FIG. 5 is a simplified depiction of portions of the machine of FIG. 4.

FIG. 5 is a partial cross sectional depiction of portions of the motor means of the machine of FIG. 4. The motor 98 is secured by a plurality of bolts, such as bolt 192, to the motor housing 96. A splined or keyed shaft 194 extends from the motor 98 into the bearing shaft 104. A plurality of bearings here shown as a first ball bearing 196 and a second ball bearing 198. The ball bearings provide a rotatable connection between the bearing shaft 104 and the stationary bearing housing 97 which is attached to and extends from the motor housing 96. Thus the shaft 194, the bearing shaft 104 and in turn, the upper shaft bolt 198 all rotate to in turn cause rotation of the casing 106. O-ring seals 200 and 202 are provided to seal the seal block 204 to the bearing shaft 104 and to the bearing housing 97. Other bearing arrangements may be provided, as desired, all to provide a sealed and rotatable association so that the motor 98 may rotate the separation chamber 74.

Figure 6:
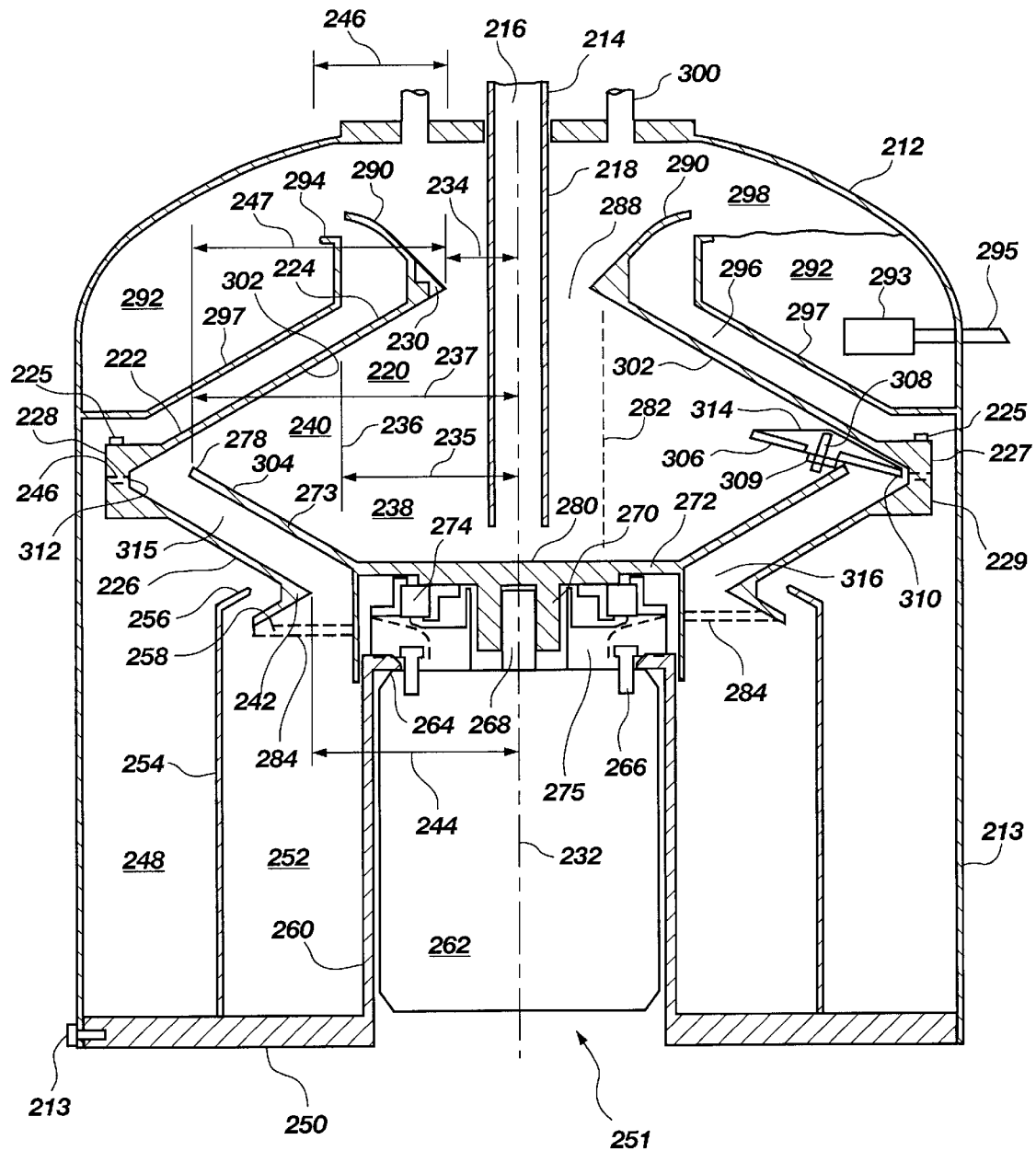
FIG. 6 is a simplified essentially cross sectional illustration of another form of a machine of the present invention.

Turning now to FIG. 6, an alternate embodiment 210 is shown. It has a housing 212 with an inlet 214 connected to receive a mixture which includes a first fluid and a second fluid of different densities. The mixture 216 may also contain entrained sediments or sludge as well as gas.

The inlet 214 has an extension 218 which passes through the housing 212 and extends into a separation chamber 220. The separation chamber has an outer wall 222 that is formed from a first weir 224 and a second weir 226 which are connected to each other by bolts 225 through flanges 227 and 229 to form an elbow 228. The first weir 224 has an edge 230 that is spaced from the central axis 232 at a radius 234 selected to be less than the radius 235 of the boundary 236 between the first volume 238 and the second volume 240 of the two fluids of the mixture 216 separated in the separation chamber 220.

The second weir 226 has an edge 242 that is spaced from the central axis 232 a radius 244 selected to be less than the radius 237 of the edge 278 and in accordance with the Equation 2 hereinbefore set forth. The difference between the radius 234 and the radius 237 is a boundary range 247. That is, the boundary 236 may be anywhere along the range 247 during normal operations. Thus, the mixture may consist of fluids of differing densities so that the boundary 236 may be positioned differently without requiring reconfiguration or restructuring of the machine 210.

The elbow 228 has a plurality of small diameter passages 246 formed about the perimeter of the separation chamber 220, each sized to receive and pass sludge extracted from the mixture 216. That is, in operation, sludge and other solids or sediments will collect at the elbow 228 and be urged by centrifugal force outwardly through the passages 246. A small portion of the second fluid separated into the second volume 240 will pass through the passages and aids in the removal of the separated material such as sludge or other sediments. Notably, the sludge and sediments are too heavy to separate with the first fluid (e.g., oil) and at the same time are desirably removed from the second fluid (e.g., water). The sludge with the small portion of water and other sediments passing through passages 246 impinge on the outer wall 213 of housing 212 and are allowed to drop to the bottom of the first collection chamber 248. The small portion of water in chamber 248 may optionally overflow into chamber 252.

It can be seen in FIG. 6 that the housing 212 is connected by a plurality of bolts such as bolt 213 to a base 250 to form the first collection chamber 248 and the second collection chamber 252.

The base 250 is formed to have a central aperture 251 sized to receive the motor means such as motor 262 therethrough. Although the motor means shown is an electric motor, it should be understood that the motor means may be any mechanical arrangement available to cause the first weir 224 and the second weir 226 and the related structure to rotate at a rate sufficient to cause the supplied mixture 216 to separate into the first fluid in the first volume 220 and the second fluid in the second volume 240. Other motor means may include a fluid drive from the fluid flow in the inlet 214.

The first collection chamber 248 and the second collection chamber 252 are each annular and are separated by a divider 254. The divider 254 has a deflector section 256 which is positioned to fit behind a trailing section 258 of the second weir 226 to inhibit the transmission of the second fluid into the first collection chamber 248. The second collection chamber 252 has an inner wall 260 which is cylindrical and sized to surround the motor 262. The motor 262 is bolted to bolt flange 264 by a plurality of bolts 266. The bolt flange 264 is secured to the inner wall 260 by any desired means including welding or other mechanical means of association as desired.

The motor 262 has a shaft 268 which is frictionally connected by a spline or key (not shown) to a shaft receiver 270 formed within the chamber base 272. The chamber base 272 is supported by a bushing or bearing arrangement 274 so that the chamber base 272 rotates over the top 275 of the flange 264. That is, the inner wall 260 and the top 275 functions as a motor housing to enclose or surround the motor 262.

A separator member 273 is connected to the chamber base 272 and extends upwardly therefrom at an angle to be generally in alignment with the second weir 226. The separator member 273 is conical in shape and circular in projection. That is, the upper edge 278 is a perimeter that is circular in projection. As can be seen, the separation chamber 220 is defined by the first weir 224, the separator member 273 and the top surface 280 of the chamber base 272. A plurality of fins 282 are positioned within the separation chamber 220 and attached to one or all of the top surface 280, the separator member 273 and the first weir 224 to rotate with the separator chamber 220 and the chamber base 272. A plurality of spokes, such as spoke 284, (shown in phantom in FIG. 6), is provided to connect the outer wall 222 of the separator chamber 220 and, more particularly, the second weir 226 to the chamber base 272 so that the separator chamber 220 rotates with the chamber base 272 and the shaft 268 of the motor 262. The spokes are rods, bars, or similar structures disposed radially about the central axis 232 to provide a secure or rigid connection in which the separator chamber 220 and more particularly the outer wall 222 remains rigidly and firmly secure and does not vibrate or oscillate during normal operations.

In operation, the separator machine 210 of FIG. 6 receives a mixture 216 into the separator chamber 220. The mixture 216 flows into the spaces between the fins 282 which are positioned comparable to those seen in FIG. 2. In turn, the mixture rotates and separates into a first volume 238 and a second volume 240. The first fluid which constitutes the first volume 238 flows past the edge 230 of the first weir 224 through what may be deemed the first outlet 288 and upwardly along a flow surface 290. The first fluid is then thrown radially outward into a first fluid receiving chamber 292. When the receiving chamber 292 fills to a preselected level, a float valve 293 operates so that the first fluid may be communicated to exterior the housing 212 by discharge line 295. The float valve may be mechanical or electrically operated by a pressure or level sensor positioned within the housing 212 and desirably in the receiving chamber 292. Lip 294 at the upper part of the inner chamber wall 297 acts to restrict transfer of the first fluid into the channel 296 between the chamber wall 297 and the first weir 224.

With entrained gas in the mixture, some gas will collect in the gas area 298 for transmission exterior the housing 212 through one or more transmission lines 300 and through a pressure regulator valve not here shown.

As noted before, entrained sludge and other material proceed to the passages 246 formed in the elbow 228 or the separator chamber 220. The sludge and other solid materials will proceed outwardly as the separator chamber 220 rotates until contact with either the inner surface 302 of the first weir 224 or the inner surface 304 of the separator member 273. The solid materials, such as sludge, will then proceed therealong toward the passages 246. Materials, such as sludge, that are disposed to contact the top 280 of the chamber base 272 will be urged outwardly under the fluid flow forces of the incoming material 216 as it discharges against the upper surface 280. Rotational forces will urge sludge and other material outwardly, with the fluid flow forces of separating fluid assisting in the migration or movement. The sludge or other material moves outwardly over the upper edge 278 toward the inner surface 302 and the apertures 246. A wheel 306 is rotatably secured by a bolt-axle combination 308 to a free moving support ring 309. The outer rim 310 of the wheel is in frictional contact with the inner surface 312 of the elbow 228. As the separator chamber 220 rotates, the wheel 306 is driven by the fluid in the second volume 240 interacting with the fins 314. In turn the wheel 306 is rotated as the separator chamber 220 and the elbow 228 rotate. The plurality of scrapers or fins 314 are formed to be in alignment with the inner surface 302 to dislodge sludge and other materials and to force such material outwardly through the plurality of passages 246.

Figure 7:
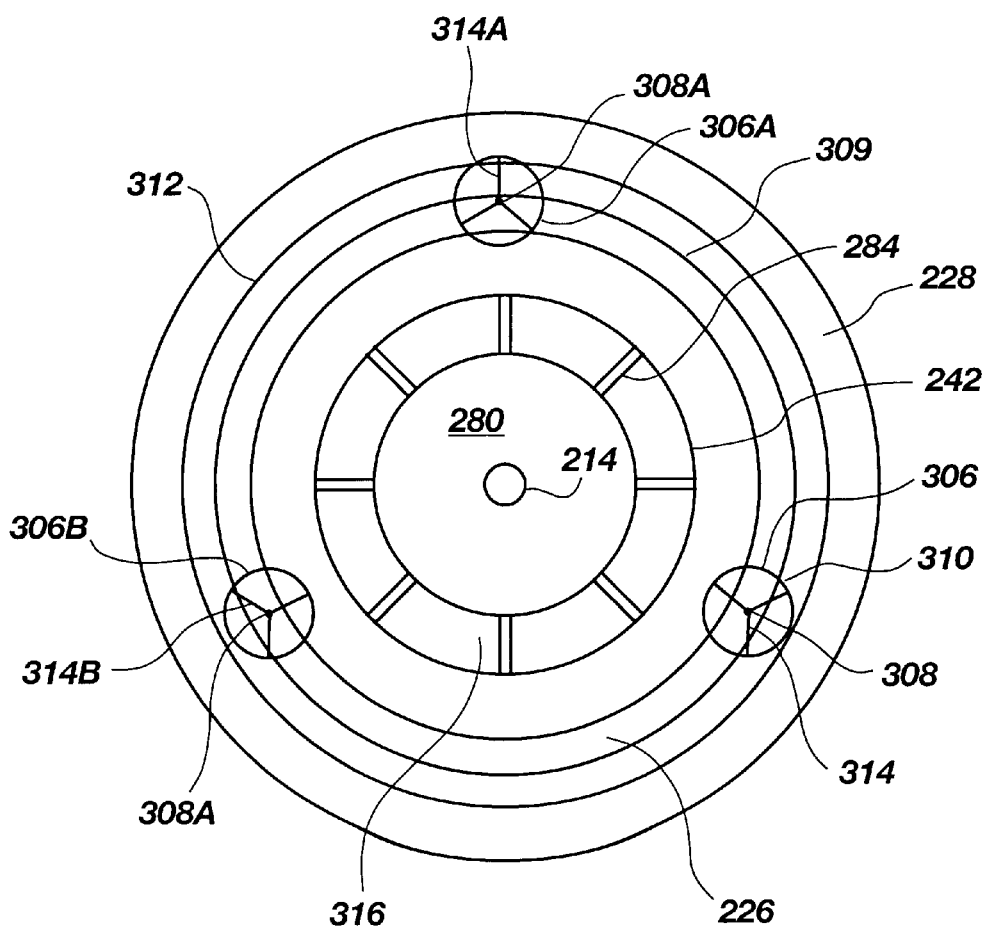
FIG. 7 is a simplified depiction of a cross section of the machine of FIG. 6 showing portions of the separation chamber.

FIG. 7 shows the inner surface 312 of the elbow 228 with the second weir 226 continuing angularly downward to the edge 242. The wheel 306 is shown disposed with its rim 310 in contact with the inner surface 312. A free-moving support ring 309 is positioned proximate the wheel 306. The bolt-axle 308 attaches the ring 309 to the wheel 306. Two other comparable wheels 306A and 306B are shown disposed in spaced relationship (about every 120 degrees) about the inner surface 312 each rotatably secured by its respective bolt-axle 308A and 308B to support ring 309 and each have a plurality of scrapers or fins 314A and 314B. Also shown are spokes 284 disposed to connect the chamber base 272 to the second weir 226.

Of course, the material such as sludge will proceed to settle in the first collection chamber 248 and may be extracted therefrom using a sediment suction line to suck the material out when desired. It can also be seen, the second fluid which comprises the second volume 240 proceeds over the outer edge 278 of the separator member 276 and into a channel 314. The channel also has a volume and does not have fins or other restrictions so that momentum of the second fluid can be conserved and does thereby create a force to retain the second fluid in the volume 240 and to position the boundary 236 as desired along the inner surface 304 of the separator member 276 and the top 280 of the chamber base 272 between the radius 234 and the radius 237. The second fluid then proceeds out of the channel 315 and through the second outlet 316 into the second collection chamber 252. The first fluid is removable from the receiving chamber 292 through the float valve 293 and discharge line 295 as hereinbefore stated. A similar float valve and discharge line is typically provided for the second collection chamber 252. In other words, removal lines with internal float valves comparable to those illustrated in FIG. 4 or suction lines operated manually or automatically (using a level sensor in the respective chamber) may be used to regulate the level in the second collection chamber 252.

In reference to both FIGS. 4 and 6, it may be noted that the drawings do not present true cross section views. For example, in both FIGS. 4 and 6, the first weir 126 and 224 respectively should be shown with lines reflecting the presence of the edge 128 and 230 as well as the thickness of the first weir 126 and the second weir 224 continuing behind their respective extensions 118 and 214. For simplification and clarity, such lines have not been presented. Nonetheless, it should be understood that the machines of FIGS. 4 and 6 as well as the structure of FIG. 5 are rotating devices with cylindrical and circular components and structures.

Figure 9:
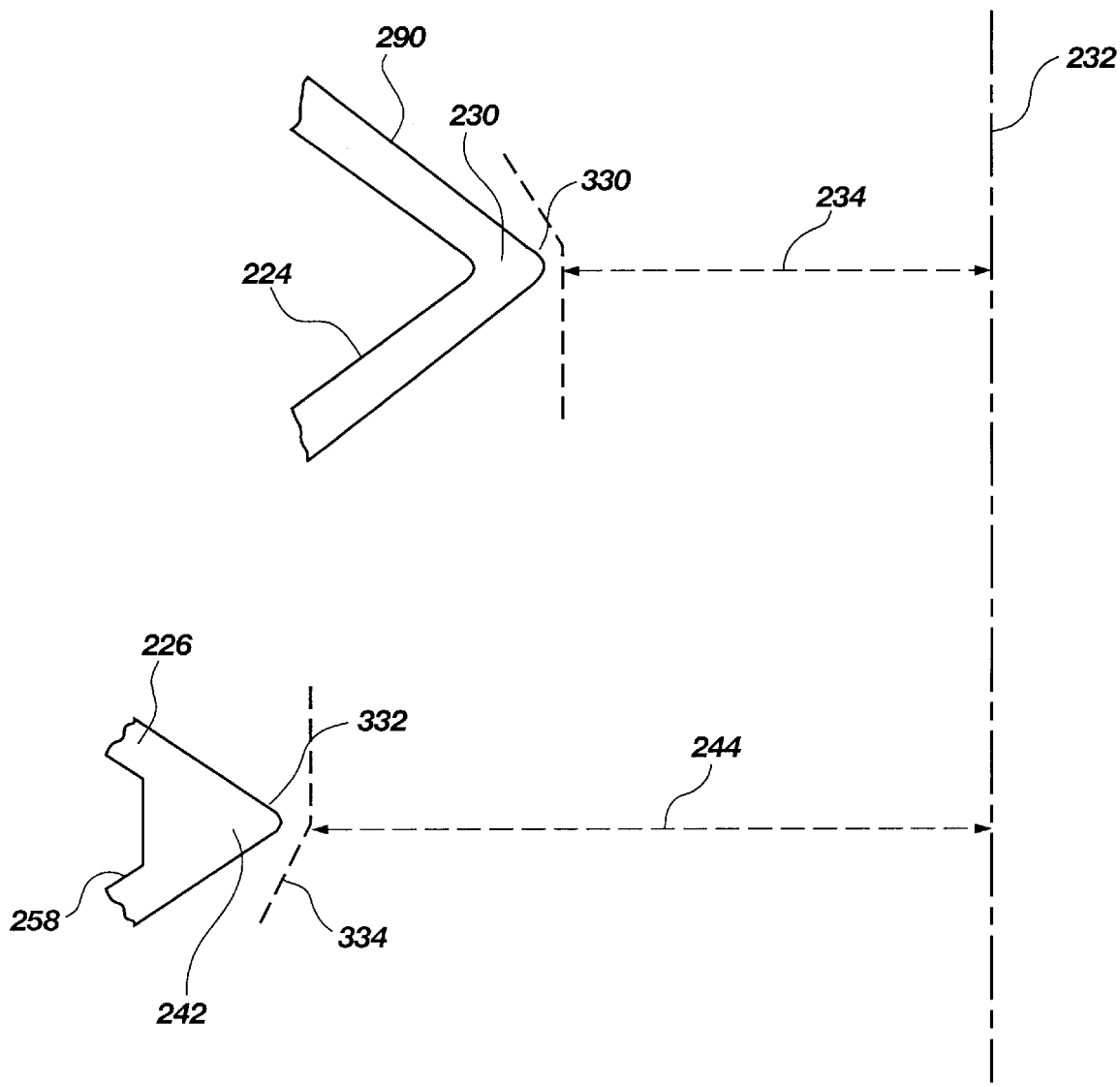
FIG. 9 is an illustration of portions of the machine of FIG. 6 showing fluid layers.

In reference to selected radii illustrated in FIGS. 1, 4 and 6, it should be recognized that for illustration, such radii are shown extending exactly to a particular structure or surface. For example, radius 234 in FIG. 6 is shown extending from central axis 232 to the edge 230. However the radius 234 actually does not extend to the surface of the edge 230. Rather, as better seen in FIG. 9, there is a layer 330 of moving first fluid over the edge 230; and the radius 234 extends to the inner surface of the layer of moving fluid. Similarly, radius 244 is shown in FIG. 6 extending to the tip 242. However, there is a layer 332 of moving second fluid comparable to layer 330 over the edge 242 so that the radius extends to the layer 332 and more specifically to the portion of level inner surface 334 of the second fluid moving over the edge 242 of the second weir 226.

In reference to FIG. 1, it should be noted that the perimeter 17 of the first weir and the perimeter 45 of the second weir are circular and are larger than the perimeters of comparable weirs or separator machines of comparable physical dimension. In turn, a separator machine employing, or constructed in accordance with the principles of the inventions herein illustrated and described not only in FIG. 1 but also in FIGS. 4 and 6, is believed to be capable of processing larger volumes or flow rates of incoming mixture than known separator machines of comparable size. Since the thickness of the layers 330 and 332 are very small, they are not illustrated in FIGS. 1, 4 and 6.

Further, it is should be recognized that the volume of fluid in second weir volume of machines employing, or constructed in accordance with the principles of the inventions herein illustrated and described not only in FIG. 1 but also in FIGS. 4 and 6, are not rotated by fins and in turn may increase in rotational rate as the fluid therein moves toward the edge of the second weir. The separator machine is thereby susceptible to operation in which edges of the weirs are farther apart axially and in which the perimeters of the weirs may be larger than the weirs of known machines of comparable physical dimension.

Those skilled in the art will recognize that the embodiments illustrated and described are merely illustrative of the principles of the invention. Reference herein to specific details is not intended to limit the scope of the invention as set forth in the following appended claims.

What is claimed:

1. A machine for separating a mixture having a first fluid and a second fluid of a density different from the density of said first fluid, said machine comprising:

a housing;

a separation chamber having a central axis and positioned within said housing, said, separation chamber having an outer wall and said separation chamber being sized to receive and contain a volume of said mixture to be rotated within said separation chamber with a first volume of said first fluid and a second volume separated from said first volume, said first volume and said second volume having a boundary, there between spaced from said central axis of said separation chamber a boundary, distance;

fin means attached to said outer wall of said separation chamber to rotate therewith and to urge said mixture and at least one of said first volume and said second volume to rotate with said separation chamber;

an inlet connected to supply said mixture from exterior said housing to said separation, chamber;

a first weir connected to said outer wall and sized to extend toward said central axis and spaced from said central axis a first distance selected to be less than said boundary distance to define a first outlet from said separation chamber through which one of said first fluid and said second fluid exits from said separation chamber;

motor means connected to rotate said separation chamber, said motor means including a chamber portion thereof positioned relative to said separation chamber and configured to extend away from said central axis a channel distance to define a channel between said chamber portion and said outer wall;

a second weir connected to one of said chamber portion and said outer wall and sized to extend toward said central axis and spaced from said central axis a second distance selected to be less than said channel distance to define a second outlet through which the other of said first fluid and said second fluid exits from said separation, chamber.

2. The machine of claim 1 further including a first fluid chamber connected to receive one of said first fluid and said second fluid from one of said first outlet and said second outlet.

3. The machine of claim 2 further including a second fluid chamber connected to receive the other of said first fluid and said second fluid from the other of said first outlet and said second outlet.

4. The machine of claim 1 further including a first fluid chamber connected to receive said first fluid from said first outlet and a second fluid chamber connected to receive said second fluid from said second outlet.

5. The machine of claim 4 wherein said first fluid chamber has first valve means associated therewith for transmitting fluid in said first fluid chamber to exterior said first fluid chamber.

6. The machine of claim 5 wherein said second fluid chamber has second valve means associated therewith for transmitting fluid in said second chamber to exterior said second fluid chamber.

7. The machine of claim 1 wherein said wherein said chamber portion includes a flange that extends outwardly a distance greater than said boundary distance and toward said outer wall to define said channel.

8. The machine of claim 7 wherein said mixture has solid materials entrained therein, wherein said outer wall is shaped to define a rim, and wherein passage means is formed in said rim for passing solid materials therethrough.

9. The machine of claim 8 wherein said mixture includes a gas; and wherein said housing has an upper surface with a port formed therein positioned to transmit gas from said housing to exterior said housing.

10. The machine of claim 1 wherein said first distance and said second distance are selected to define an overlap distance selected to position the boundary of said mixture therebetween.

11. The machine of claim 10 wherein said overlap distance is selected to position the boundary of different mixtures.

12. The machine of claim 1 wherein said second weir is spaced from said chamber portion to define a second weir volume, wherein said channel communicates one of said first fluid and said second fluid to said second weir volume which second weir volume is rotatable at an angular velocity by said separation chamber to have a momentum sufficient to retain said first volume and said second volume in said separation chamber with some of both exiting through a selected one of said first outlet and said second outlet.

13. A machine for separating a first fluid from a second fluid of a continuous flow of a mixture having a first fluid and a second fluid of a density different from the density of said first fluid, said machine comprising:

a housing;

an inlet connected to said housing to continuously supply from exterior said housing a mixture of a first fluid and of a second fluid of a density different from the density of said first fluid;

a separation chamber positioned within said housing and spaced therefrom to define a first fluid passage for the passage of fluid between said separation chamber and said housing, said separation chamber being configured to rotate within said housing about a central axis, said separation chamber being positioned to receive said mixture from said inlet, said separation chamber having an outer wall with a top and a bottom and said separation chamber being sized to receive and contain said mixture to be rotated within and by said separation chamber to separate said mixture into a first volume of said first fluid and a second volume of said second fluid separated from said first volume at a boundary spaced from said central axis of said separation chamber a boundary distance;

fin means attached to said outer wall of said separation chamber to rotate therewith and to urge said mixture and at least one of said first volume and said second volume to rotate with said separation chamber;

a first weir connected to said outer wall proximate the top of said outer wall and sized to extend toward said central axis a first weir distance selected to be more than said boundary distance to define a first outlet from said separation chamber through which one of said first fluid and said second fluid exits from said separation chamber into said first fluid passage, said first outlet having a first outlet distance extending from said central axis to the end of said first weir;

a second weir connected to said outer wall proximate the bottom thereof, said second weir being sized to extend toward said central axis a second weir distance selected to be less than said boundary distance to define a second outlet through which the other of said first fluid and said second fluid exits from said separation chamber;

a flange positioned within said separation chamber spaced from said second weir to define a second weir volume, said flange being formed to extend away from said central axis toward said outer wall of said separation chamber a flange distance which is larger than said boundary distance and said flange being spaced from said outer wall a second weir channel distance to define a second weir channel between said chamber portion and said outer wall for the continuous passage of the other of said first fluid and said second fluid through said second weir channel into said second weir volume and out of said second outlet;

motor means connected to rotate said separation chamber, said motor means being operable to to rotate said separation chamber at an angular velocity to rotate said mixture in said separation chamber to impart separation forces thereto and to impart a momentum to the fluid in said second weir volume to retain said first volume and said second volume within said separation chamber as the mixture continuously enters through said inlet and as the first fluid and second fluid continuously exit through the selected first outlet and second outlet.

14. The machine of claim 13 further including a first fluid chamber connected to said first fluid passage to receive one of said first fluid and said second fluid therefrom, and further including a second fluid passage connected to said second outlet and a second fluid chamber connected to said second fluid passage to receive the other of said first fluid and said second fluid therefrom.

15. The machine of claim 14 wherein said first fluid chamber and said second fluid chamber are within said housing.

16. The machine of claim 15 wherein said housing has a side wall and a transverse divider passing through said central axis to form said first fluid chamber and said second fluid chamber.

17. The machine of claim 16 wherein said second fluid passage includes a chamber having an upper end positioned to define an opening to receive one of said first fluid and said second fluid from said second outlet, a base and a second passage upright plate extending upwardly from said base and extending about its perimeter between said transverse divider to define a second passage outlet in communication with said second chamber.

18. The machine of claim 17 wherein said first fluid passage has a floor attached to said housing to extend inwardly therefrom with a first passage upright plate that extends between said transverse divider and is attached to said transverse divider.

19. The machine of claim 18 wherein said second passage upright plate and said first passage upright plate are a cylinder disposed about said central axis.

20. The machine of claim 15 wherein said first chamber has first valve means associated therewith for transmitting fluid in said first fluid chamber to exterior said first fluid chamber.

21. The machine of claim 20 wherein said second chamber has second valve means associated therewith for transmitting fluid in said second chamber to exterior said second fluid chamber.

22. The machine of claim 13 wherein mixture contains entrained solid material, wherein said outer wall has a portion shaped to collect solids urged outwardly during rotation of said separation chamber, wherein said outer wall has a solids passage formed there in for the passage of solid materials to exterior said separation chamber, and wherein said solids passage is in communication with a chamber for the collection of solid materials separated from said mixture.

23. The machine of claim 13 wherein said mixture includes at least one gas and at least one liquid, and wherein said housing has an upper end with a port formed therein configured to vent gas from said first fluid passage to exterior said housing.

24. The machine of claim 13 wherein said inlet extends through said housing and into said separation chamber and is disposed along said central axis.

25. The machine of claim 24 wherein said inlet is cylindrical with a radius less than said first outlet distance.

26. The machine of claim 24 wherein said motor means is attached to said flange to rotate said flange, and wherein said flange has a plurality of spokes that extend therefrom to the said outer wall to cause rotation of said outer wall.

27. The machine of claim 26 wherein said inlet has an end spaced from the flange a distance selected to cause the mixture to impinge on the flange.

28. The machine of claim 26 wherein said flange has means to divert the mixture coming into said separation chamber through said inlet outwardly toward said outer wall of said separation chamber.

29. The machine of claim 13 wherein said second weir extends angularly downwardly from said bottom end of said separation chamber.

30. The machine of claim 29 wherein said first weir extends angularly upward from said outer wall.

31. The machine of claim 30 wherein said outer wall includes said first weir and said second weir.

32. The machine of claim 31 wherein said outer wall includes an elbow with a plurality of passages formed therein for the passage of solids entrained in said mixture or formed in said mixture.

33. The machine of claim 32 further including a wheel rotationally mounted to one of said first weir and said second weir, said wheel having a rim positioned to frictionally engage with said elbow to rotate said wheel upon rotation of said separation chamber, and at least one fin attached to said wheel and positioned to be in alignment with and spaced to rotate over one of said first weir and said second weir to dislodge solid material appended thereto.

34. The machine of claim 30 wherein housing has a chamber wall extending therefrom spaced from said first weir to define a first passage there between, said chamber wall defining a first fluid receiving chamber, wherein said flow surface is attached proximate the first weir edge to extend upwardly and outwardly to direct one of said first fluid and said second fluid passing through said first outlet into said first fluid receiving chamber.

35. The machine of claim 34 wherein said first fluid receiving chamber has valve means operable to transfer fluid from said first fluid collection chamber to exterior said housing.

36. The machine of claim 13 wherein said motor means includes a motor having an axle connected to said flange.

37. The machine of claim 36 wherein said motor means includes a motor positioned within said housing and a casing which is connected to be rotated by said motor, said casing being cylindrical and disposed about said central axis to extend into said separation chamber, and wherein said flange is attached to said casing.

38. The machine of claim 13 wherein said housing has a motor chamber formed therein sized to receive said motor means sized to rotate said separation chamber.

39. The machine of claim 38 wherein said housing includes a first collection chamber and a second collection chamber, wherein said motor chamber is cylindrical in form with an inner wall defining the inner wall of the second collection chamber, wherein said housing wall defines the outer wall of said first collection chamber, and wherein there is a common wall separating said first collection chamber and said second collection chamber.

40. A method for separating a first fluid from a second fluid of a continuous flow of a mixture having a first fluid and a second fluid of a density different from the density of said first fluid, said method comprising:

provide a machine having
a housing,
an inlet connected to said housing to receive a continuous supply from exterior said housing a mixture of a first fluid and of a second fluid of a density different from the density of said first fluid,
a separation chamber positioned within said housing and spaced therefrom to define a first fluid passage for the passage of fluid between said separation chamber and said housing, said separation chamber being configured to rotate within said housing about a central axis, said separation chamber being positioned to receive said mixture from said inlet, said separation chamber having an outer wall with a top and a bottom and said separation chamber being sized to receive and contain said mixture to be rotated within and by said separation chamber to separate said mixture into a first volume of said first fluid and a second volume of said second fluid separated from said first volume at a boundary spaced from said central axis of said separation chamber a boundary distance,
fin means attached to said outer wall of said separation chamber to rotate therewith and to urge said mixture and at least one of said first volume and said second volume to rotate with said separation chamber,
a first weir connected to said outer wall proximate the top of said outer wall and sized to extend toward said central axis a first weir distance selected to be more than said boundary distance to define a first outlet from said separation chamber through which one of said first fluid and said second fluid exits from said separation chamber into said first fluid passage, said first outlet having a first outlet distance extending from said central axis to the end of said first weir,
a second weir connected to said outer wall proximate the bottom thereof, said second weir being sized to extend toward said central axis a second weir distance selected to be less than said boundary distance to define a second outlet through which the other of said first fluid and said second fluid exits from said separation chamber,
a flange positioned within said separation chamber spaced from said second weir to define a second weir volume, said flange being formed to extend away from said central axis toward said outer wall of said separation chamber a flange distance which is larger than said boundary distance and said flange being spaced from said outer wall a second weir channel distance to define a second weir channel between said chamber portion and said outer wall for the continuous passage of the other of said first fluid and said second fluid through said second weir channel into said second weir volume and out of said second outlet,
motor means connected to rotate said separation chamber, said motor means being operable to rotate said separation chamber at an angular velocity to rotate said mixture in said separation chamber to impart separation forces thereto and to impart a momentum to the fluid in said second weir volume to retain said first volume and said second volume within said separation chamber as the mixture continuously enters through said inlet and as the first fluid and second fluid continuously exit through the selected first outlet and second outlet;
supplying said mixture to said inlet;
operating said motor means to rotate said separation chamber at an angular velocity to rotate said mixture in said separation chamber to impart separation forces thereto and to impart a momentum to the fluid in said second weir volume to retain said first fluid at said first volume and said second fluid at second volume within said separation chamber as the mixture continuously enters through said inlet and as the first fluid and second fluid continuously exit through the selected first outlet and second outlet.

* * * * *